United States Patent
Doktar (10) Patent No.: US 10,763,741 B2
(45) Date of Patent: Sep. 1, 2020

(54) METHOD FOR REDUCING COMMON MODE CURRENT IN POWER ELECTRONIC EQUIPMENT

(71) Applicant: Vacon Oy, Vaasa (FI)

(72) Inventor: Andreas Doktar, Korsholm (FI)

(73) Assignee: VACON OY, Vaasa (FI)

( * ) Notice: Subject to any disclaimer, the term of this patent is extended or adjusted under 35 U.S.C. 154(b) by 0 days.

(21) Appl. No.: 16/398,789

(22) Filed: Apr. 30, 2019

(65) Prior Publication Data

US 2020/0007025 A1    Jan. 2, 2020

(30) Foreign Application Priority Data

Jun. 27, 2018    (DE) .................. 10 2018 115 490

(51) Int. Cl.
  *H02M 1/12*    (2006.01)
  *H02M 7/23*    (2006.01)

(52) U.S. Cl.
  CPC ............ *H02M 1/12* (2013.01); *H02M 7/23* (2013.01); *H02M 2001/123* (2013.01)

(58) Field of Classification Search
  CPC .. H02M 1/12; H02M 2001/123; H02M 1/126; H02M 1/36; H02M 7/44; H02M 2001/0009
  See application file for complete search history.

(56) References Cited

U.S. PATENT DOCUMENTS 5,460,244 A * 10/1995 Tanahashi ............... H02M 1/36
                                              187/293
7,327,588 B2    2/2008 Ollila
(Continued)

FOREIGN PATENT DOCUMENTS

EP    1575156 B1    6/2015
WO    2011000511 A2    1/2011

OTHER PUBLICATIONS

Wang et al., "Investigation of Zero Sequence Circulating Current Suppression for Parallel Three-Phase Grid-Connected Converters Without Communication," IEEE Transactions on Industrial Electronics, vol. 65, No. 10 (Oct. 2018).

*Primary Examiner* — Alex Torres-Rivera
(74) *Attorney, Agent, or Firm* — McCormick, Paulding & Huber PLLC (57) ABSTRACT

The present invention relates to a method for reducing common mode current in power electronic equipment comprising two or more active front end (AFE) components (1) coupled in parallel between an AC supply grid (2) and a DC-link (3). A duty cycle of pulse width modulation (PWM) for the AFE components (1) is determined, and an error signal is derived based on the determined duty cycle of PWM and on a common mode current of the AFE components (1). A correction voltage is derived, based on the error signal, and a DC voltage control signal is derived based on the derived correction voltage and a measured DC voltage of the DC-link (3) and/or a DC voltage reference. The power electronic equipment is controlled in accordance with the derived DC voltage control signal. The present invention also relates to a method for starting active front end (AFE) components (1) of power electronic equipment comprising two or more AFE components (1) coupled in parallel between an AC supply grid (2) and a DC-link (3).

15 Claims, 5 Drawing Sheets

(56) References Cited

U.S. PATENT DOCUMENTS

| | | | | |
|---|---|---|---|---|
| 2009/0244945 | A1* | 10/2009 | Hatanaka | H02M 7/23 363/127 |
| 2012/0155131 | A1* | 6/2012 | Moreno-Castaneda | H02M 7/23 363/69 |
| 2014/0063877 | A1* | 3/2014 | Taira | H02M 7/23 363/70 |
| 2016/0352249 | A1* | 12/2016 | Agirman | H02M 7/493 |
| 2019/0115820 | A1* | 4/2019 | Fu | H02M 1/4216 |

* cited by examiner

METHOD FOR REDUCING COMMON MODE CURRENT IN POWER ELECTRONIC EQUIPMENT

CROSS-REFERENCE TO RELATED APPLICATION

This application claims foreign priority benefits under U.S.C. § 119 to German Patent Application No. 102018115490.9 filed on Jun. 27, 2018, the content of which is hereby incorporated by reference in its entirety.

TECHNICAL FIELD

The present invention relates to common mode current reduction, in particular reduction of common mode current, in power electronic equipment comprising two or more active front end (AFE) components.

BACKGROUND

AFE converters are power electronic components used in power electronic systems. Such an AFE utilises power semiconductor devices controlled by signal electronics, followed by a filter circuit. Moreover, an AFE allows bidirectional power exchange between AC voltage source and DC-link. AFEs can also be coupled in parallel, but in order to do so, a paralleling control method is needed.

Previously a paralleling control method for paralleled AFEs connected to the same AC voltage source and same DC-link has been applied. This method adjusts the pulse width modulation (PWM) period length to minimize circulating common mode current, which effectively synchronises the triangular PWM carriers. According to this method, paralleling of AFEs without the need of interconnecting the control systems is provided. By omitting the interconnection of control systems enables a better scalability, but makes load balancing more challenging.

Usage of modern low inductance magnetics, such as powder cores, in combination with faster switching power electronics will result in a lower common mode inductance. Any error in DC voltage feedback will thus result in the common mode current being much greater compared to a design solution with low switching frequency and high filter inductance. A higher common mode current will result in higher losses in the converter, thus the efficiency of the AFE will be reduced. Therefore, a new method is needed in order to reduce these common mode currents in order to improve the efficiency of the AFE.

SUMMARY

It is an object of embodiments of the invention to provide a method for reducing common mode current in power electronic equipment, in which noise originating from DC voltage errors is reduced.

It is a further object of embodiments of the invention to provide a method for reducing common mode current in power electronic equipment, in which the efficiency of the equipment is improved.

According to a first aspect the invention provides a method for reducing common mode current in power electronic equipment comprising two or more active front end (AFE) components coupled in parallel between an AC supply grid and a DC-link, the method comprising the steps of:

- determining a duty cycle of pulse width modulation (PWM) for the AFE components,
- deriving an error signal based on the determined duty cycle of PWM and on a common mode current of the AFE components,
- deriving a correction voltage, based on the error signal,
- deriving a DC voltage control signal based on the derived correction voltage and a measured DC voltage of the DC-link and/or a DC voltage reference, and
- controlling the power electronic equipment in accordance with the derived DC voltage control signal.

Thus, the first aspect of the invention relates to a method for reducing common mode current in power electronic equipment. The power electronic equipment is of a kind which comprises two or more active front end (AFE) components. In the present context the term 'active front end (AFE)' should be interpreted to mean a power electronic component, e.g. a converter, which comprises a self-commutated, pulsed rectifier with regenerative feedback facilities comprising IGBT modules.

The two or more AFEs are coupled in parallel between an AC supply grid and a DC-link. In the present context, the term 'AC supply grid' should be interpreted to mean a power supply, such as a power grid, which supplies AC power. In the present context, the term DC-link' should be interpreted to mean a connecting point for one or more electrical components requiring a DC power supply. One electrical component could, e.g., be a motor, such as a compressor, connected to the DC-link via an inverter.

Thus, the AFEs are each connected to the AC supply grid as well as to the DC-link. Thereby the AFEs are able to convert the AC power of the supply grid to DC power at the DC-link.

In the method according to the first aspect of the invention, a duty cycle of pulse width modulation (PWM) for the AFE components is initially determined. In the present context the term 'duty cycle of PWM' should be interpreted to mean the ratio between on-time and off-time of the pulse width modulation of the AFEs. Thus, during this step, the modulation of the AFEs is determined. It should be noted, that the AFEs will normally be modulated in the same manner, i.e. the duty cycle of the PWM will normally be identical for all of the AFEs.

The duty cycle of PWM may be obtained from a controller which controls the PWM of the AFEs. Alternatively, it may be derived from other available information, such as switching times and control periods.

Next, an error signal is derived, based on the determined duty cycle of PWM and on a common mode current of the AFE components. The common mode current could, e.g., be obtained by direct measurement. The error signal could, e.g., be derived by multiplying the common mode current of the AFE components and the zero sequence of the duty cycle of PWM or a value being representative for the duty cycle of PWM. For instance, the common mode current may be multiplied with an offset value of the duty cycle of PWM rather than with the actual duty cycle of PWM. This can, e.g., be relevant in the case that the duty cycle of PWM ranges between positive values, such as between 0 and 1. In this case it may be desirable to multiply the common mode current with a duty cycle value which has an alternating sign behaviour, and therefore a value of 0.5 may be subtracted from the zero sequence of the duty cycle of PWM before the duty cycle of PWM is multiplied with the common mode current. The error signal derived in this manner is proportional to the DC voltage error. Accordingly, the derived error signal is representative for the undesired DC voltage error.

Next, a correction voltage is derived, based on the error signal. This may include passing the error signal through a low pass filter in order to remove high frequent components of the signals, and/or introducing a gain. Since the correction voltage is derived, based on the error signal, and since the error signal is proportional to the DC voltage error, the correction voltage is dependent on the DC voltage error. Accordingly, the correction voltage may represent a required correction to the present DC voltage of the AFEs in order to eliminate, or at least reduce, the undesired DC voltage error.

Next, a DC voltage control signal is derived, based on the derived correction voltage and a measured DC voltage of the DC-link and/or a DC voltage reference. Since the DC voltage control signal is derived based on the correction voltage, it is also dependent on the undesired DC voltage error. In the case that the DC voltage control signal is derived on the basis of the measured DC voltage, the DC voltage control signal represents a corrected value of the measured DC voltage.

In the case that the DC voltage control signal is derived on the basis of the DC voltage reference, the DC voltage control signal represents a corrected value of the DC voltage reference.

In any event, the DC voltage control signal represents a corrected DC voltage, and the correction is dependent on the undesired DC voltage error.

Finally, the power electronic equipment is controlled in accordance with the derived DC voltage control signal. Since the DC voltage control signal represents a DC voltage which has been corrected by a correction voltage, which is dependent on the undesired DC voltage error, the power electronic equipment is thereby controlled in a manner which takes the undesired DC voltage error into account. Thus, the power electronic equipment is controlled in such a manner that the undesired DC voltage error is eliminated, or at least reduced.

The step of deriving an error signal may be based on a common mode current of the AFE components at a peak of the modulation carrier wave. According to this embodiment, the common mode current at a peak of the modulation carrier wave, i.e. the common mode current at a time where the PWM peaks, is used as a basis for deriving the error signal. Thereby it is ensured that the derived error signal takes a worst case scenario into account.

As an alternative, the common mode current at another time in the PWM cycle could be used.

The method may further comprise the step of measuring the common mode current of the AFE components. According to this embodiment, the common mode current is obtained directly by means of measurement. This is an easy manner of obtaining an accurate value of the common mode current.

As an alternative, the common mode current may be derived from another parameter, such as a measured common mode voltage.

The step of determining a duty cycle of PWM for the AFE components may comprise deriving the duty cycle of PWM based on the common mode current.

As an alternative, the step of determining a duty cycle of PWM may be derived in any other suitable manner, such as based on a common mode voltage.

The step of deriving the duty cycle of PWM based on the common mode current may further comprise filtering the common mode current by means of one or more filters. According to this embodiment, the filtering, i.e. removing unwanted parts of a signal originating from e.g. noise or other sources, is used to filter the common mode current in order to obtain a smooth signal characteristic. The filter could be in the form of digital filter such as a finite impulse response (FIR) filter, or an analogue filter in the form of a low pass filter, or a combination of both.

The step of deriving a DC voltage control signal may comprise adding the derived correction voltage and the measured DC voltage of the DC-link and/or the DC voltage reference. According to this embodiment, the DC voltage control signal is the measured DC voltage of the DC link and/or the DC voltage reference, with the derived correction voltage added thereto. Thereby the DC voltage control signal is simply the measured DC voltage of the DC link and/or the DC voltage reference, corrected by the correction voltage. Thus, the correction voltage may represent a required value in order to correct the present DC voltage of the AFEs such that undesired DC voltage error is eliminated or at least reduced.

Alternatively, the DC voltage control signal may be derived in any other suitable manner.

The step of deriving a correction voltage may comprise feeding the error signal to an integral controller. An integral controller provides an output rate of change that is determined based on the magnitude of the error and the integral constant. Thus, according to this embodiment, the accumulated error signal is taken into account when deriving the correction voltage.

Alternatively or additionally, the error signal may be passed through one or more filters, such as an analogue or digital filter or a combination of both, e.g. before the error signal is fed to the integral controller. Another possibility is to extend the integral controller with a proportional integral controller (PI).

The method may further comprise the steps of:
identifying an AFE component being in stop state,
determining a duty cycle of PWM of the AFE components which are already running,
deriving an adjustment to a control period for the AFE component being in stop state, based on the determined duty cycle of PWM, and
starting the AFE component being in stop state, and operating said AFE component in accordance with the derived adjustment to the control period.

According to this embodiment, at least one of the AFEs is in a stop state, i.e. at least one of the AFEs is not running. However, at least one other AFE is running. An AFE being in stop state is initially identified.

Then a duty cycle of PWM of the AFEs which are already running is determined. Thereby the modulation of the AFEs which are already running is obtained.

Next, an adjustment to a control period for the AFE component being in stop state is derived, based on the determined duty cycle of PWM of the AFEs which are already running. Accordingly, the adjusted control period depends on the duty cycle of PWM of the AFEs which are already running, and thereby the control period for the AFE being in stop state will be synchronized with respect to the AFEs which are already running.

Finally, the AFE being in stop state is started and operated in accordance with the derived adjustment to the control period. Accordingly, it is ensured that the AFE being started is operated in a manner which is synchronized with the operation of the AFEs which were already running.

If an AFE being started is not synchronized with the AFEs which are already running, there is a risk that undesired transients occur in the common mode current immediately after starting the AFE. It is therefore an advantage of this embodiment of the invention that it is ensured that the AFE being started is synchronized with the AFEs which are already running, thereby reducing misalignment. Reducing misalignment before start results in lower transients and reduces the likelihood of tripping.

In the case that there are two or more AFEs being in stop state, the process described above may be repeated for each AFE being in stop state, thereby starting these AFEs sequentially, while ensuring that the AFEs being started are synchronized with the AFEs which are already running.

The step of deriving an adjustment to the control period may comprise deriving an error signal based on the determined duty cycle of PWM. This error signal may be filtered to remove any high frequency content or any unwanted noise before feeding the error signal to a proportional controller.

Alternatively or additionally, the error signal may be passed through one or more filters, such as an analogue or digital filter or a combination of both, e.g. before the error signal is fed to the proportional controller.

The step of deriving an adjustment to the control period may further comprise feeding the error signal to a proportional (P) controller or to a proportional integral (PI) controller. The error signal may be fed to the P/PI controller. The output of the P/PI controller is a switching time, which is summed to the control period of the modulator. Furthermore, the error signal may be fed to a filter, such as a finite impulse response (FIR) filter before being fed to the P/PI controller.

The step of determining a duty cycle of PWM of the AFE components which are already running may comprise determining a duration of an on-time of the AFE components which are already running. The duty cycle is the ratio of the on-time and off-time, and the duty cycle can therefore easily be derived from the duration of the on-time.

In accordance with the first aspect of the invention, there is provided also a non-volatile computer readable medium encoded with a computer program for reducing common mode current in power electronic equipment comprising two or more active front end (AFE) components (1) coupled in parallel between an AC supply grid (2) and a DC-link (3), the computer program comprising computer executable instructions for controlling a programmable processor to:
determining a duty cycle of pulse width modulation (PWM) for the AFE components (1),
deriving an error signal based on the determined duty cycle of PWM and on a common mode current of the AFE components (1),
deriving a correction voltage, based on the error signal,
deriving a DC voltage control signal based on the derived correction voltage and a measured DC voltage of the DC-link (3) and/or a DC voltage reference, and
controlling the power electronic equipment in accordance with the derived DC voltage control signal.

In accordance with the first aspect of the invention, there is provided also a new computer program product. The computer program product comprises a non-volatile computer readable medium, e.g. a compact disc "CD", encoded with a computer program according to the invention.

According to a second aspect the invention provides a method for starting active front end (AFE) components of power electronic equipment comprising two or more AFE components coupled in parallel between an AC supply grid and a DC-link, the method comprising the steps of:
starting a first AFE component,
determining a duty cycle of pulse width modulation (PWM) of the first AFE component,
deriving an adjustment to a control period for an AFE component being in stop state, based on the determined duty cycle of PWM, and
starting the AFE component being in stop state, and operating said AFE component in accordance with the derived adjustment to the control period.

It should be noted that the skilled person would readily recognise that any feature described in combination with the first aspect of the invention could also be combined with the second aspect of the invention, and vice versa.

In the method according to the second aspect of the invention, the AFEs are initially all in a stop state, i.e. none of them are running. When it is desired to start the AFEs, a first AFE is started, while the other AFEs remain in the stop state.

Then a duty cycle of PWM of the first AFE is determined, e.g. in the manner described above with reference to the first aspect of the invention.

Next, an adjustment to a control period for an AFE being in stop state is derived, based on the determined duty cycle of PWM of the first AFE. This has also been described above with reference to the first aspect of the invention.

Finally, the AFE component being in stop state is started and operated in accordance with the derived adjustment to the control period. This has also been described above with reference to the first aspect of the invention.

The step of deriving an adjustment to the control period may comprise deriving an error signal based on the determined duty cycle of PWM. This has already been described in detail above.

The step of deriving an adjustment to the control period may further comprise feeding the error signal to a proportional (P) controller or to a proportional integral (PI) controller. This has already been described in detail above.

The step of determining a duty cycle of PWM of the first AFE component may comprise determining a duration of an on-time of the first AFE component. This has already been described in detail above.

The method may further comprise the step of sequentially starting the AFE components being in stop state, and controlling the AFE components being started based on a duty cycle of PWM of the AFE components which are already running. Thereby the AFEs may be started, one at a time, by repeating the steps described above, until all of the AFEs have been started. Thereby it is ensured that all of the AFEs will eventually be synchronized.

In accordance with the invention, there is provided also a non-volatile computer readable medium encoded with a computer program for starting active front end (AFE) components (1) of power electronic equipment comprising two or more AFE components (1) coupled in parallel between an AC supply grid (2) and a DC-link (3), the computer program comprising computer executable instructions for controlling a programmable processor to:
starting a first AFE component (1),
determining a duty cycle of pulse width modulation (PWM) of the first AFE component (1),
deriving an adjustment to a control period for an AFE component (1) being in stop state, based on the determined duty cycle of PWM, and
starting the AFE component (1) being in stop state, and operating said AFE component (1) in accordance with the derived adjustment to the control period.

In accordance with the second aspect of the invention, there is provided also a new computer program product. The computer program product comprises a non-volatile computer readable medium, e.g. a compact disc "CD", encoded with a computer program according to the invention.

Various exemplifying and non-limiting embodiments of the invention are described in accompanied dependent claims.

Exemplifying and non-limiting embodiments of the invention both as to constructions and to methods of operation, together with additional objects and advantages thereof, are best understood from the following description of specific exemplifying embodiments when read in conjunction with the accompanying drawings.

The verbs "to comprise" and "to include" are used in this document as open limitations that neither exclude nor require the existence of un-recited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE DRAWINGS

The invention will now be described in further detail with reference to the accompanying drawings in which.

DETAILED DESCRIPTION

The specific examples provided in the description below should not be construed as limiting the scope and/or the applicability of the accompanied claims. Lists and groups of examples provided in the description below are not exhaustive unless otherwise explicitly stated.

Figure 1:
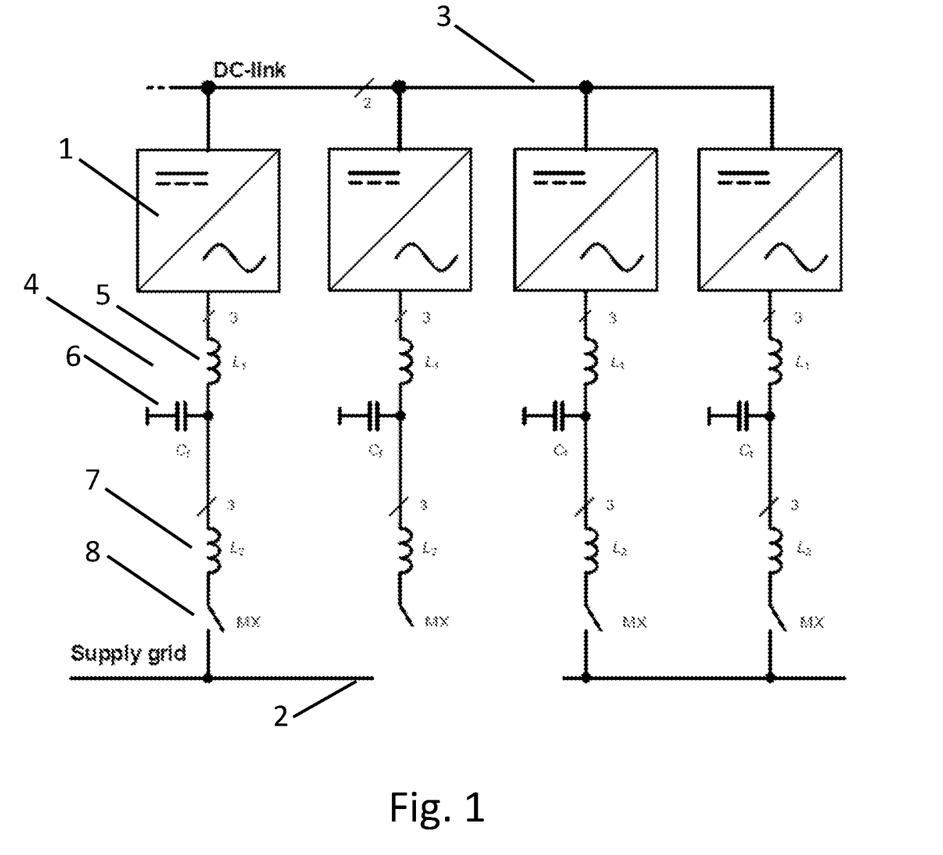
FIG. 1 is a diagram showing paralleled AFEs being controlled in accordance with an embodiment of the invention, FIG. 2 are plots of common mode currents originating from PWM carrier misalignment and DC voltage error in paralleled AFEs being controlled in accordance with a prior art method.

FIG. 1 is a diagram showing a number of AFEs 1, four of which are shown, coupled in parallel between an AC supply grid 2 and a DC-link 3. The AFEs 1 are in the form of converters. Each AFE is coupled to the AC supply grid 2 via a filter 4 comprising a first inductance 5 and a capacitance 6, and a second inductance 7. Furthermore, each AFE 1 can be connected to and disconnected from the AC supply grid 2 by means of a switch 8. This will be described in further detail below.

Due to rapid changes in voltages and currents within a switching converter, the AFEs 1 are a source of noise with other components as well as with its own operation. One type of noise is the common mode current, which is measured along the normal power connections, through inductors, cables, bus bars etc. A way of reducing this type of noise on the power lines is to design a filter that can take this into account, such as filter 4 in FIG. 1. These stray capacitances exist between various system components and ground. Due to safety reasons the majority of power electronic equipment has a grounded cabinet. Thus the noise appearing on the ground line will contribute most to the total common mode current. Moreover, PWM carrier misalignment and DC voltage measurement error also effects the common mode current.

The PWM carrier misalignment arises due to the lack of centralized control, which changes the position of the PWM carrier of the respective AFEs 1. The PWM carriers start with random phase with respect to each other. The phase shift denotes the position of a point on the PWM carrier in time. A misalignment in the PWM carrier would result in the generated common mode voltage generated to be of different phase angle. This will cause a common mode current to flow. Thus the total generated common mode current can vary due to this.

The DC voltage measurement error is an error between a measured voltage between two AFE 1 components. For the DC voltage measurement error, it can be assumed that the error is specific to particular production unit due to component tolerances.

Figure 2:
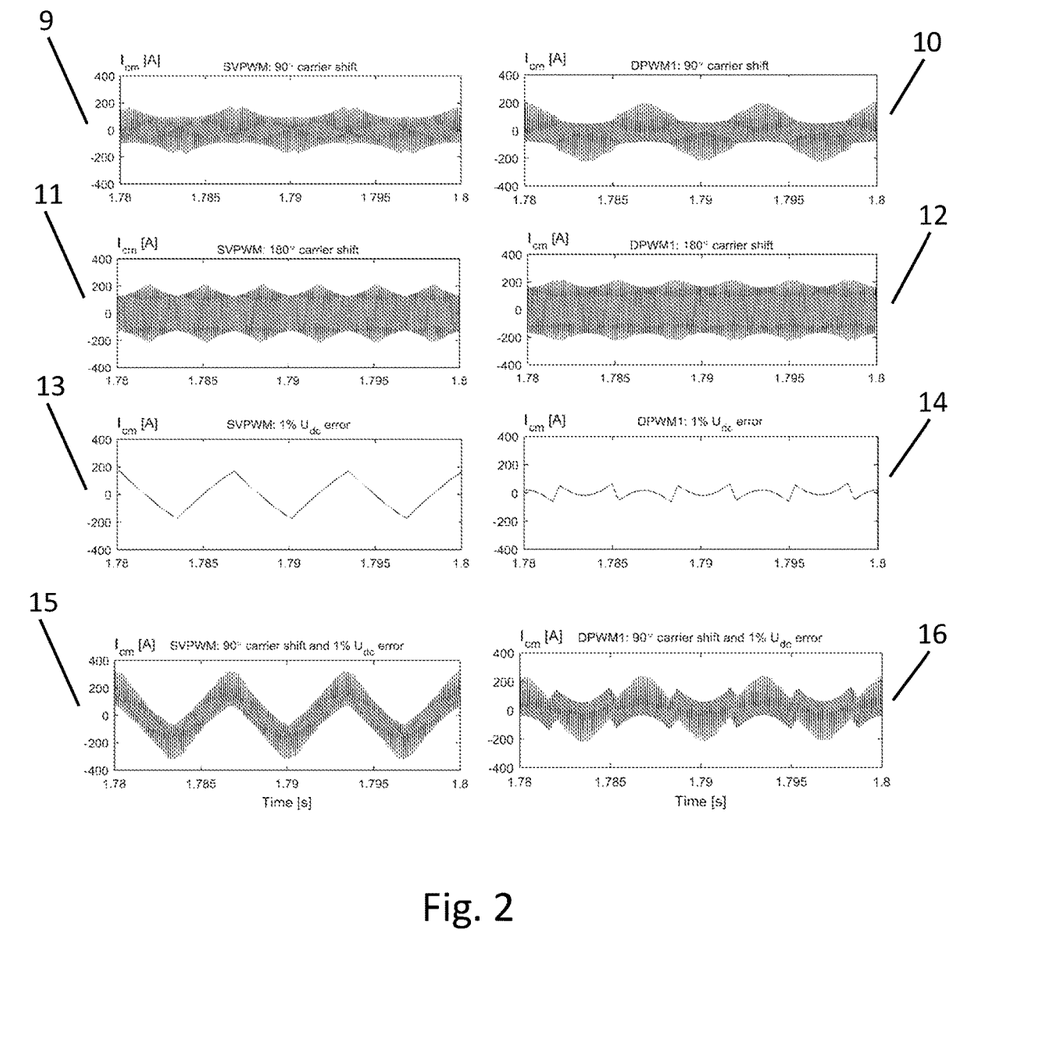

FIG. 2 are plots of common mode currents originating from PWM carrier misalignment and DC voltage error in paralleled AFEs being controlled in accordance with a prior art method. The AFEs could, e.g., be the AFEs 1 illustrated in FIG. 1. Two different modulation schemes are illustrated, i.e. space vector PWM (SVPWM) in the four left plots 9, 11, 13, 15 and discontinuous PWM (DPWM1) in the four right plots 10, 12, 14, 16. All the plots of FIG. 2 show common mode current as a function of time under one period of the fundamental frequency.

The plots 9 and 10 show common mode current originating from PWM carrier misalignment for a PWM carrier misalignment of 90°.

The plots 11 and 12 show common mode current originating from PWM carrier misalignment for a PWM carrier misalignment of 180°.

It can be seen from the plots 9, 10, 11 and 12 that PWM carrier misalignment results in a common mode current with high frequency. It can further be seen from the plots 9, 10, 11 and 12 the frequency and the amplitude of the common mode current at a PWM carrier misalignment of 180° are higher than the frequency and the amplitude of the common mode current at a PWM carrier misalignment of 90°.

The plots 13 and 14 show common mode current originating from a DC voltage error of 1%. It can be seen that DC voltage error results in a common mode current with low frequency and with a substantially triangular characteristic.

The plots 15 and 16 show the total common mode current originating from PWM carrier misalignment of 90° and DC voltage error of 1%. It can be seen that the total common mode current comprises a high frequent part originating from the PWM carrier misalignment and a low frequent part originating from the DC voltage error.

The plots of FIG. 2 all illustrate a prior art situation where it has not been attempted to reduce the common mode currents originating from either PWM carrier misalignment or DC voltage error.

Figure 3:
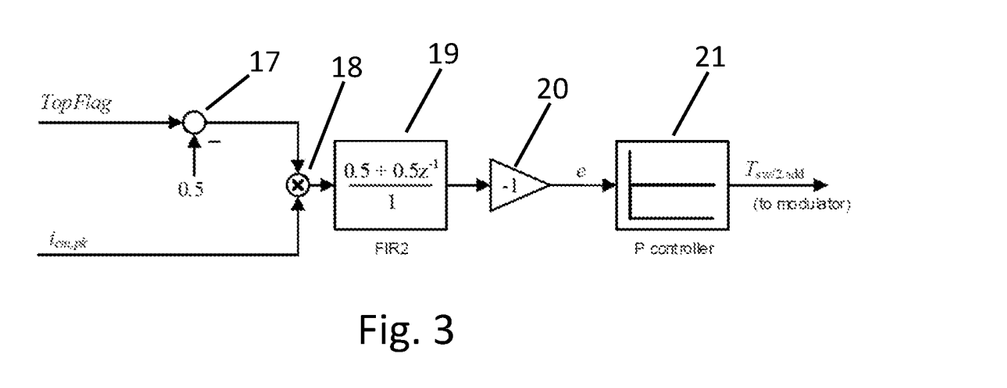
FIG. 3 is a block diagram illustrating a prior art control method for reducing common mode current originating from carrier misalignment.

FIG. 3 is a block diagram illustrating a prior art control method for reducing common mode current originating from PWM carrier misalignment. The method is used to synchronise multiple PWM carriers using a common mode current, $i_{cm,pk}$, computed from three-phase current sampled at the peak of the PWM carrier.

A TopFlag value is supplied to a point of summation 17. The TopFlag value is a variable which is assumed to be one (true) when the PWM carrier is at the so called top update and zero (false) when at bottom update. At the point of summation 17 0.5 is subtracted from the TopFlag value in order to obtain an alternating sign behaviour. The resulting sign alternating TopFlag value is supplied to a point of multiplication 18.

The peak common mode current, $i_{cm,pk}$, is also supplied to the point of multiplication 18. At the point of multiplication 18 the high frequent common mode current, $i_{cm,pk}$, caused by PWM carrier misalignment is demodulated by multiplying the common mode current, $i_{cm,pk}$, with sign alternating TopFlag value.

The demodulated common mode current is supplied to a finite impulse response (FIR2) filter 19, where the remaining high frequency content is filtered out, and the signal is then inverted through a gain 20 of −1.

Next, the signal is supplied to a proportional (P) controller 21, which is used to adjust the carrier through a variable, $T_{sw/2,add}$. The variable, $T_{sw/2,add}$, denotes the time that has to be added to a control period, $T_{sw/2}$, prior to being supplied to a modulator (not shown). The control period, $T_{sw/2}$, defines the PWM half cycle time.

It should be noted that instead of the P controller, a proportional-integral (PI) controller could be used.

As mentioned, this control method only deals with the PWM carrier misalignment, and thus can only solve this issue. Accordingly, applying this method would reduce the common mode currents illustrated in plots 9, 10, 11 and 12 of FIG. 2, but would not affect the common mode currents illustrated in plots 13 and 14 of FIG. 2. Thus, even when applying this method, common mode currents are not fully eliminated, since the common mode current originating from DC voltage error is still present. As described above, this results in reduced efficiency of the AFEs.

Figure 4:
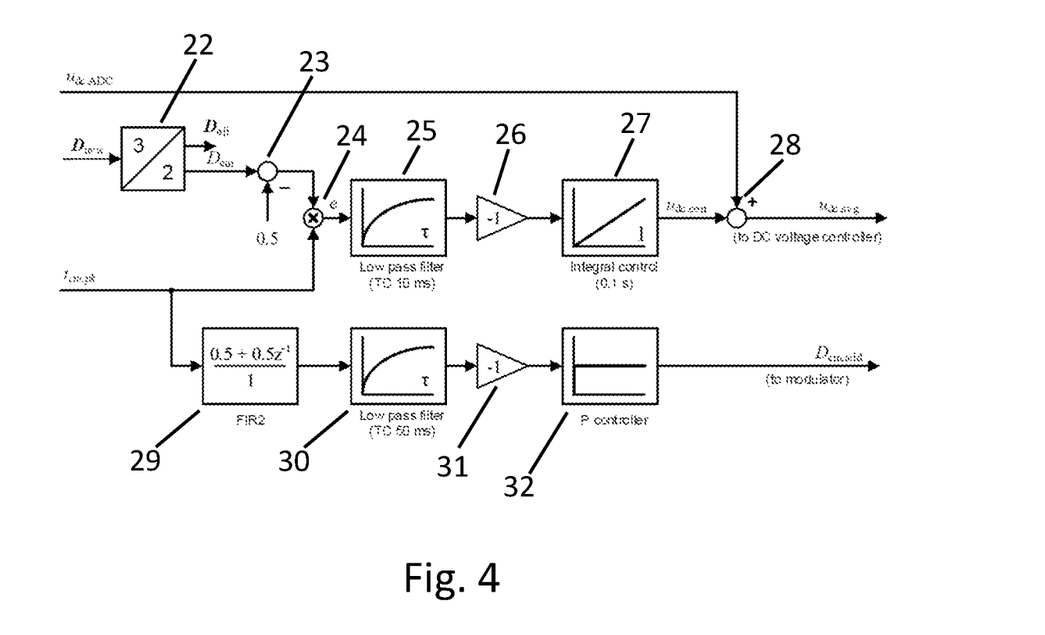
FIG. 4 is a block diagram illustrating a method according to an embodiment of the invention, FIG. 5 are plots of common mode currents originating from PWM carrier misalignment and DC voltage error in paralleled AFEs being controlled in accordance with a method according to an embodiment of the invention.

FIG. 4 is a block diagram illustrating a method according to an embodiment of the invention. The method is used to reduce the DC voltage error measurement between paralleled AFEs using a peak common mode current, $i_{cm,pk}$, computed from three-phase current sampled at the PWM carrier.

A duty cycle, $D_{uvw}$, value is supplied to a mathematical block 22. The duty cycle, $D_{uvw}$, is the common mode of the duty cycles, which is the output of the modulator ranging between 0 and 1.

A zero sequence of the duty cycle of PWM, $D_{cm}$, is supplied to a point of summation 23. The zero sequence is calculated in the following: Dcm=1/3*Du+1/3*Dv+1/3*Dw. At the point of summation 23, 0.5 is subtracted from the duty cycle, $D_{cm}$, value in order to obtain an alternating sign behaviour. The resulting sign alternating duty cycle, $D_{uvw}$, value is supplied to a point of multiplication 24.

The peak common mode current, $i_{cm,pk}$, is also supplied to the point of multiplication 24. At the point of multiplication 24 the common mode current, $i_{cm,pk}$, is demodulated by multiplying the common mode current, $i_{cm,pk}$, with sign alternating duty cycle, $D_{cm}$, value.

The demodulated common mode current is supplied to a low pass filter 25, where the remaining high frequency content is filtered out, and the signal is then inverted through a gain 26 of −1.

Next, the signal is supplied to an integral (I) controller 27, which is used to adjust the DC voltage, $u_{dc,avg}$, through a DC voltage, $u_{dc,corr}$. The DC voltage, udc,corr, is supplied to a point of summation 28.

A DC voltage, $u_{dc,ADC}$, is also supplied to the point of summation 28. The DC voltage, $u_{dc,ADC}$, is the measured DC voltage voltage of the AFE 1 component.

A DC voltage, $u_{dc,avg}$, is supplied to a DC voltage controller (not shown). The DC voltage, $u_{dc,avg}$, is the sum of the DC voltages, $u_{dc,corr}$ and $u_{dc,ADC}$, and denotes the DC voltage value for the paralleled AFEs.

For common mode inductances that are pure inductive (no resistive part), the common mode current may comprise a DC component. In this case, it is necessary to augment the integral controller 27 used in the DC voltage adjustment.

The peak common mode current is supplied to a finite impulse response (FIR2) filter 29, where the remaining high frequency content is filtered out. Thereafter, the signal is supplied to a low pass filter (30), and the signal is further filtered.

Next, the signal is then inverted through a gain 31 of −1, before it is supplied to a P controller 32.

The output of the P controller 32 is a duty cycle value, $D_{cm,add}$, which is supplied to a modulator (not shown). The duty cycle value, $D_{cm,add}$, is used to adjust the modulated common mode voltage in order to drive any DC current to zero.

Since the DC voltage, $u_{dc,avg}$, which is supplied to the DC voltage controller (not shown) is a corrected DC voltage signal, it is ensured that all AFE units will converge towards the same steady-state DC voltage, $u_{dc,avg}$, value. Thereby the common mode current originating from the DC voltage error, illustrated in plots 13 and 14 of FIG. 2, is reduced.

For pure inductive common mode inductances, the common mode current may comprise a DC component. This issue is solved by supplying duty cycle value, $D_{cm,add}$, to the modulator (not shown).

Figure 5:
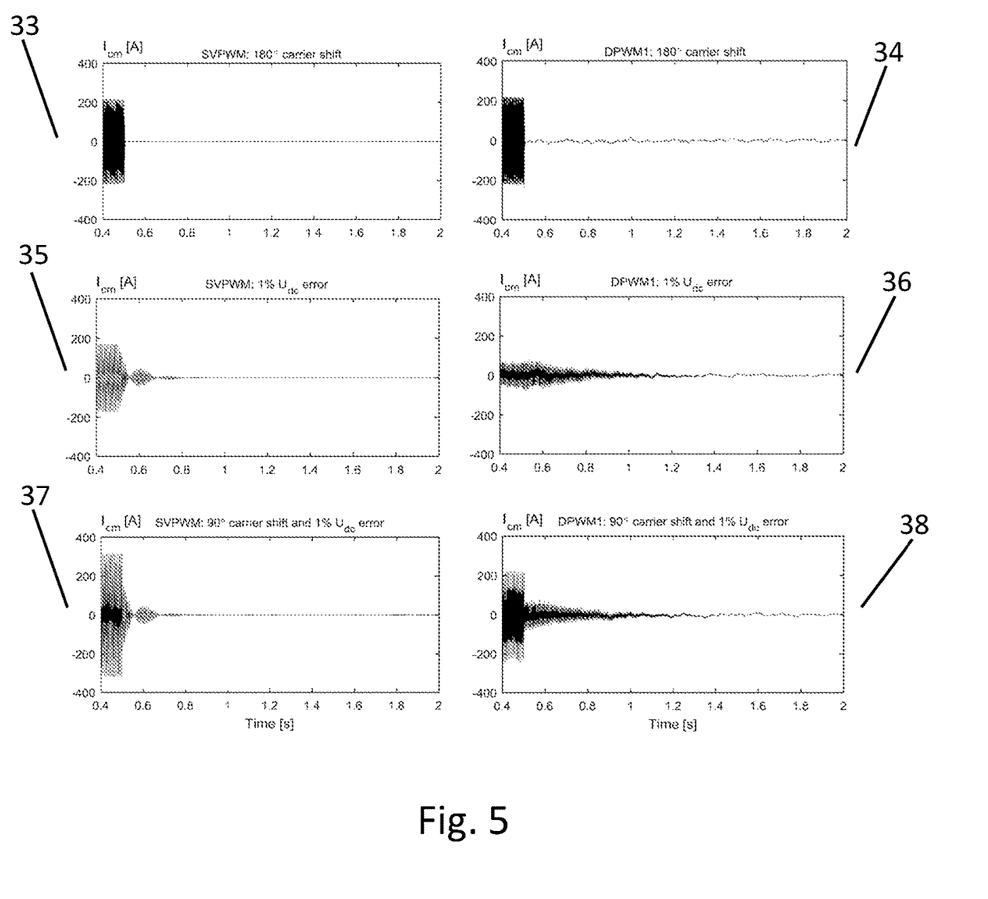

FIG. 5 are plots of common mode currents originating from PWM carrier misalignment and DC voltage error in paralleled AFEs being controlled in accordance with a method according to an embodiment of the invention, in which the control method illustrated by the block diagram of FIG. 3 as well as the control method illustrated by the block diagram of FIG. 4 are applied. The AFEs could, e.g., be the AFEs 1 illustrated in FIG. 1. Two different modulation schemes are illustrated, i.e. space vector PWM (SVPWM) in the three left plots and discontinuous PWM (DPWM1) in the three right plots. All the plots of FIG. 5 show common mode current as a function of time under one period of e.g. 1.6 seconds, where the paralleling control is enabled at time 0.5 s.

The plots 33 and 34 show common mode current originating from PWM carrier misalignment for a PWM carrier misalignment of 180°. The plots 35 and 36 show common mode current originating from a DC voltage error of 1%. Finally, the plots 37 and 38 show the total common mode current originating from PWM carrier misalignment of 90° and DC voltage error of 1%.

When comparing the plots of FIG. 5 to the plots of FIG. 2, it is clear that applying the control method illustrated by the block diagram of FIG. 3 as well as the control method illustrated by the block diagram of FIG. 4 results in a significant reduction of the common mode current. It is noted that the common mode current originating from PWM carrier misalignment, and shown in plots 33 and 34, is reduced by means of the control method illustrated by the block diagram of FIG. 3, and the common mode current originating from DC voltage error, and shown in plots 35 and 36, is reduced by means of the control method illustrated by the block diagram of FIG. 4.

Figure 6:
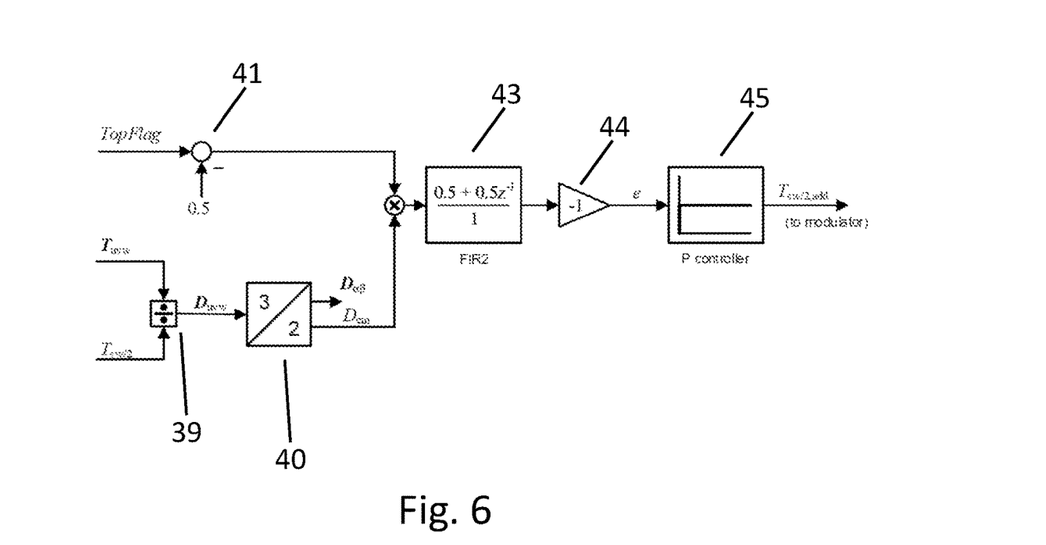
FIG. 6 is a block diagram illustrating a method according to an alternative embodiment of the invention, and FIG. 7 are plots of common mode currents in paralleled AFEs being controlled in accordance with a method according to an embodiment of the invention, during start-up.

FIG. 6 is a block diagram illustrating a method according to an embodiment of the invention. The method is used to synchronise the PWM carrier of an AFE during start-up to one that is already running by monitoring the voltage seen at the inverter terminals. The AFE being started could, e.g., be started by closing a switch, illustrated by reference numeral 8 in FIG. 1.

A variable, $T_{uvw}$, value is supplied to a point of division 39. The time variable, $T_{uvw}$, is the voltage state feedback averaged over a control period.

A variable, $T_{sw/2}$, value is also supplied to a point of division 39. The variable, $T_{sw/2}$, is the control period length.

The output of the point of division 39 is a duty cycle, $D_{uvw}$, value. The duty cycle, $D_{uvw}$, value is supplied to a mathematical block 40. The duty cycle, $D_{uvw}$, is the common mode of the duty cycles.

A TopFlag value is supplied to a point of summation 41. The TopFlag value is a variable which is assumed to be one (true) when the PWM carrier is at the so called top update and zero (false) when at bottom update. At the point of summation 41 0.5 is subtracted from the TopFlag value in order to obtain an alternating sign behaviour. The resulting sign alternating TopFlag value is supplied to a point of multiplication 42.

The output of the mathematical block is a common mode duty cycle, $D_{cm}$, which is also supplied to the point of multiplication 42.

The output of the point of multiplication is a demodulated signal, which is a function of PWM carrier misalignment.

The demodulated signal is supplied to a finite impulse response (FIR2) filter 43, where the remaining high frequency content is filtered out, and the signal is then inverted through a gain 44 of −1.

Next, the signal is supplied to a P controller 45, which is used to adjust the carrier through a variable, $T_{sw/2,add}$. The variable, $T_{sw/2,add}$, denotes the time that has to be added to a control period, $T_{aw/2}$, prior being supplied to a modulator (not shown). The control period, $T_{sw/2}$, defines the PWM half cycle time.

Since the variable, $T_{sw/2,add}$, which is supplied to the modulator (not shown) is used to adjust the control period, $T_{sw/2}$, it is ensured that the PWM carrier of an AFE unit during start-up can be synchronised with an AFE that is already running.

Figure 7:
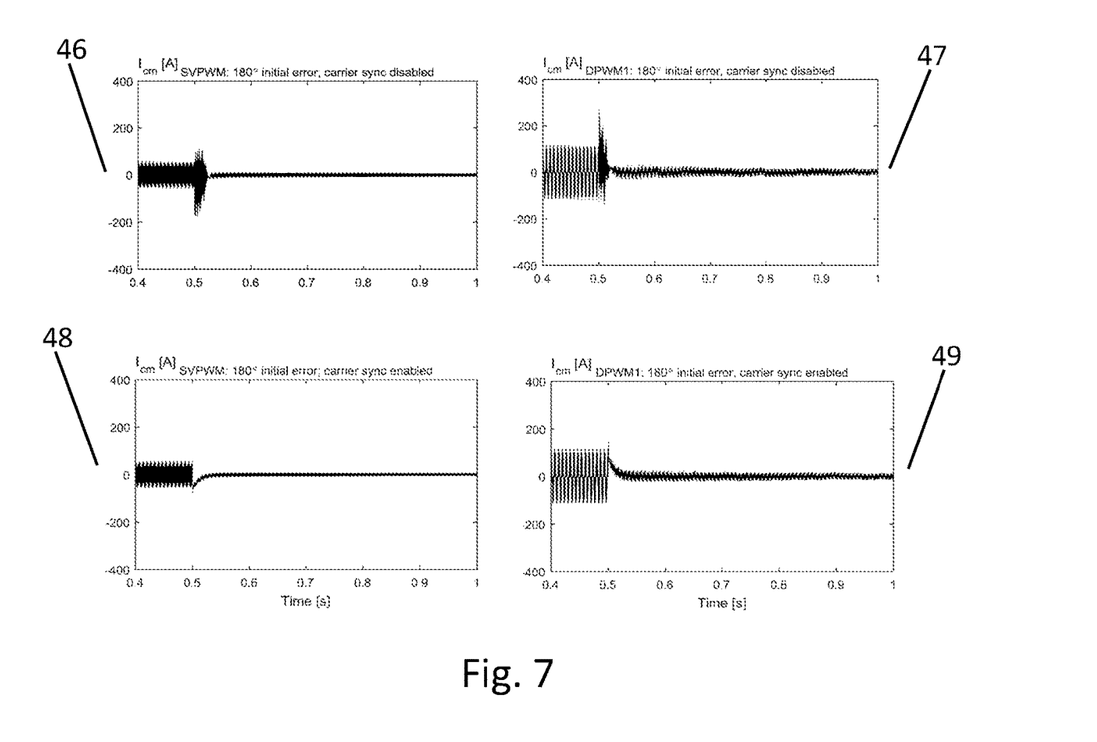

FIG. 7 are plots of common mode currents originating from PWM carrier synchronisation during start-up in paralleled AFEs being controlled in accordance with a method according to an embodiment of the invention, in which the control method illustrated by the block diagram of FIG. 3 as well as the control method illustrated by the block diagram of FIG. 4, and the control method illustrated by the block diagram of FIG. 6 are applied. The AFEs could, e.g., be the AFEs 1 illustrated in FIG. 1. Two different modulation schemes are illustrated, i.e. space vector PWM (SVPWM) in the two left plots and discontinuous PWM (DPWM1) in the two right plots. All the plots of FIG. 7 show common mode current as a function of time under one period of the fundamental frequency.

The plots 46 and 47 show common mode current originating from PWM carrier synchronisation for a PWM carrier misalignment of 180°, when the control method illustrated by the block diagram of FIG. 6 is not applied. The plots 48 and 49 show common mode current originating from PWM carrier synchronisation for a PWM carrier misalignment of 180°, when the control method illustrated by the block diagram of FIG. 6 is applied.

In the plots of FIG. 7, a second AFE is started at time 0.5 s. The plots 46 and 47 of FIG. 7 show that the common mode current fluctuates rapidly and with a high amplitude immediately after starting the second AFE at time 0.5 s, when the carrier synchronisation is disabled. On the other hand, the plots 48 and 49 of FIG. 7 show that the common mode current is substantially reduced immediately after starting the second AFE at time 0.5 s, when the carrier synchronisation is enabled.

When comparing the plots of FIG. 7, it is clear that applying the control method illustrated by the block diagram in FIG. 6 results in a reduction of the common mode current when starting a second AFE.

Following computer programs according to an exemplifying and non-limiting embodiment comprises computer executable instructions for controlling a programmable processor to carry out actions related to a method according to any of the above-described exemplifying and non-limiting embodiments.

A computer program for reducing common mode current in power electronic equipment comprising two or more active front end (AFE) components (1) coupled in parallel between an AC supply grid (2) and a DC-link (3), the computer program comprising computer executable instructions for controlling a programmable processor to:
  determining a duty cycle of pulse width modulation (PWM) for the AFE components (1),
  deriving an error signal based on the determined duty cycle of PWM and on a common mode current of the AFE components (1),
  deriving a correction voltage, based on the error signal,
  deriving a DC voltage control signal based on the derived correction voltage and a measured DC voltage of the DC-link (3) and/or a DC voltage reference, and
  controlling the power electronic equipment in accordance with the derived DC voltage control signal.

A computer program for starting active front end (AFE) components (1) of power electronic equipment comprising two or more AFE components (1) coupled in parallel between an AC supply grid (2) and a DC-link (3), the computer program comprising computer executable instructions for controlling a programmable processor to:
  starting a first AFE component (1),
  determining a duty cycle of pulse width modulation (PWM) of the first AFE component (1),
  deriving an adjustment to a control period for an AFE component (1) being in stop state, based on the determined duty cycle of PWM, and
  starting the AFE component (1) being in stop state, and operating said AFE component (1) in accordance with the derived adjustment to the control period.

The above-mentioned computer programs can be e.g. subroutines and/or functions implemented with a programming language suitable for the programmable processor under consideration.

A computer program product according to an exemplifying and non-limiting embodiment comprises a computer readable medium, e.g. a compact disc "CD", encoded with a computer program according to an exemplifying embodiment.

The non-limiting, specific examples provided in the description given above should not be construed as limiting the scope and/or the applicability of the appended claims. Furthermore, any list or group of examples presented in this document is not exhaustive unless otherwise explicitly stated.

What is claimed is:

1. A method for reducing common mode current in power electronic equipment comprising two or more active front end (AFE) components coupled in parallel between an AC supply grid and a DC-link, the method comprising the steps of:
   determining a duty cycle of pulse width modulation (PWM) for the AFE components,
   deriving an error signal based on the determined duty cycle of PWM and on a common mode current of the AFE components,
   deriving a correction voltage, based on the error signal,
   deriving a DC voltage control signal based on the derived correction voltage and a measured DC voltage of the DC-link and/or a DC voltage reference, and
   controlling the power electronic equipment in accordance with the derived DC voltage control signal.

2. The method according to claim 1, wherein the step of determining the duty cycle of PWM comprises deriving the duty cycle of PWM based on the common mode current of the AFE components.

3. The method according to claim 2, further comprising a step of measuring the common mode current of the AFE components.

4. The method according to claim 3, wherein the step of deriving the duty cycle of PWM based on the common mode current comprises filtering the common mode current by means of one or more filters.

5. The method according to claim 4, wherein the step of deriving the DC voltage control signal comprises adding the derived correction voltage and the measured DC voltage of the DC-link and/or the DC voltage reference.

6. The method according to claim 3, wherein the step of deriving the DC voltage control signal comprises adding the derived correction voltage and the measured DC voltage of the DC-link and/or the DC voltage reference.

7. The method according to claim 2, wherein the step of deriving the DC voltage control signal comprises adding the derived correction voltage and the measured DC voltage of the DC-link and/or the DC voltage reference.

8. The method according to claim 1, wherein the step of deriving the DC voltage control signal comprises adding the derived correction voltage and the measured DC voltage of the DC-link and/or the DC voltage reference.

9. The method according to claim 1, wherein the step of deriving the correction voltage comprises feeding the error signal to an integral controller.

10. The method according to claim 1, further comprising the steps of:
    identifying an AFE component being in stop state,
    determining a duty cycle of PWM of the AFE components which are already running,
    deriving an adjustment to a control period for the AFE component being in stop state, based on the determined duty cycle of PWM, and
    starting the AFE component being in stop state, and operating said AFE component in accordance with the derived adjustment to the control period.

11. The method according to claim 10, wherein the step of deriving the adjustment to the control period comprises deriving an error signal based on the determined duty cycle of PWM.

12. The method according to claim 11, wherein the step of deriving the adjustment to the control period further comprises feeding the error signal to a proportional (P) controller or to a proportional integral (PI) controller.

13. The method according to claim 11, wherein the step of determining the duty cycle of PWM of the AFE components, which are already running comprises determining a duration of an on-time of the AFE components, which are already running.

14. The method according to claim 1, wherein the step of deriving the error signal is based on the common mode current of the AFE components at a peak of a modulation carrier wave.

15. A non-volatile computer readable medium encoded with a computer program for reducing common mode current in power electronic equipment comprising two or more active front end (AFE) components coupled in parallel between an AC supply grid and a DC-link, the computer program comprising computer executable instructions for controlling a programmable processor to:
    determining a duty cycle of pulse width modulation (PWM) for the AFE components,
    deriving an error signal based on the determined duty cycle of PWM and on a common mode current of the AFE components,
    deriving a correction voltage, based on the error signal,
    deriving a DC voltage control signal based on the derived correction voltage and a measured DC voltage of the DC-link and/or a DC voltage reference, and
    controlling the power electronic equipment in accordance with the derived DC voltage control signal.

* * * * *